Patented Oct. 31, 1950

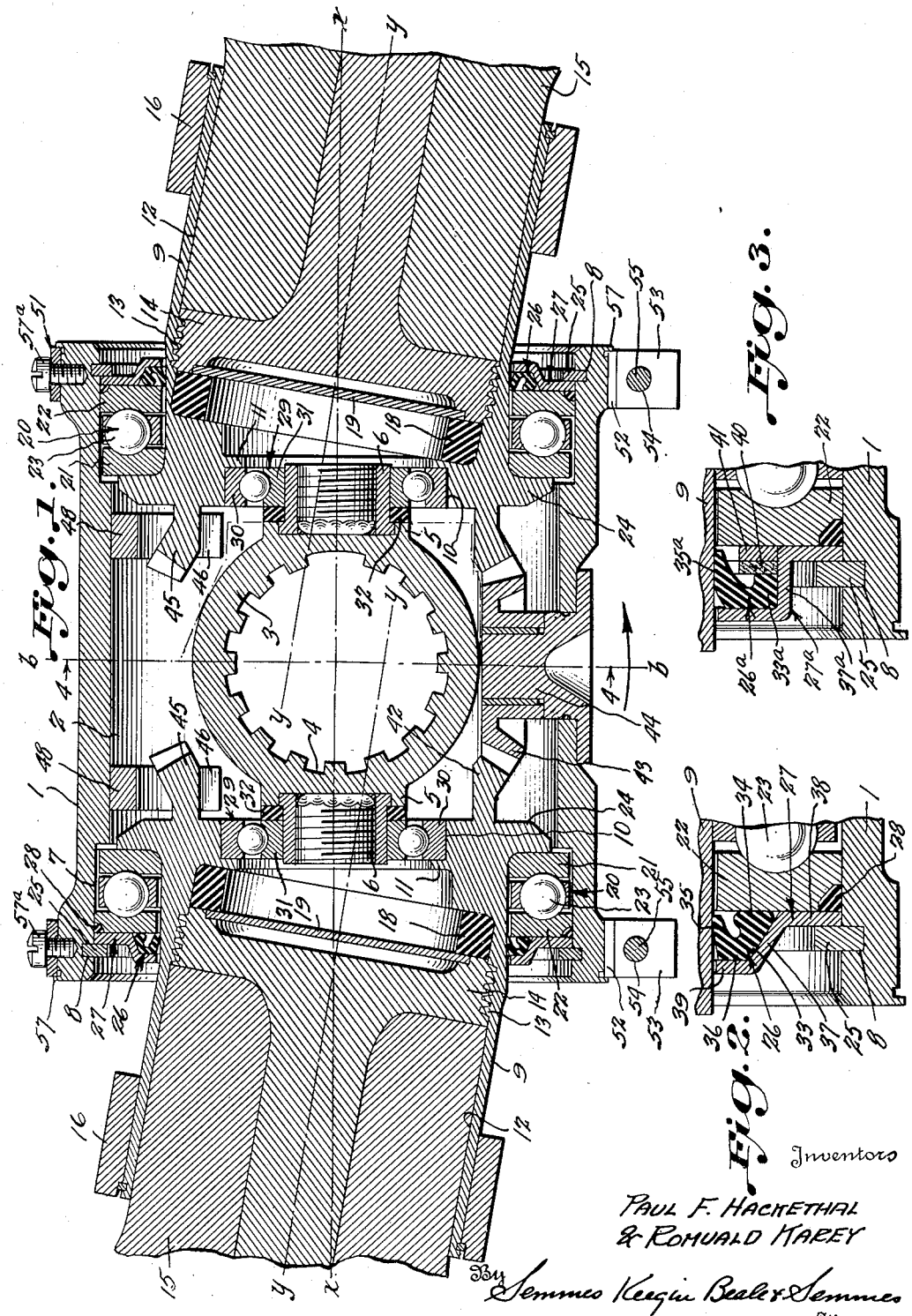

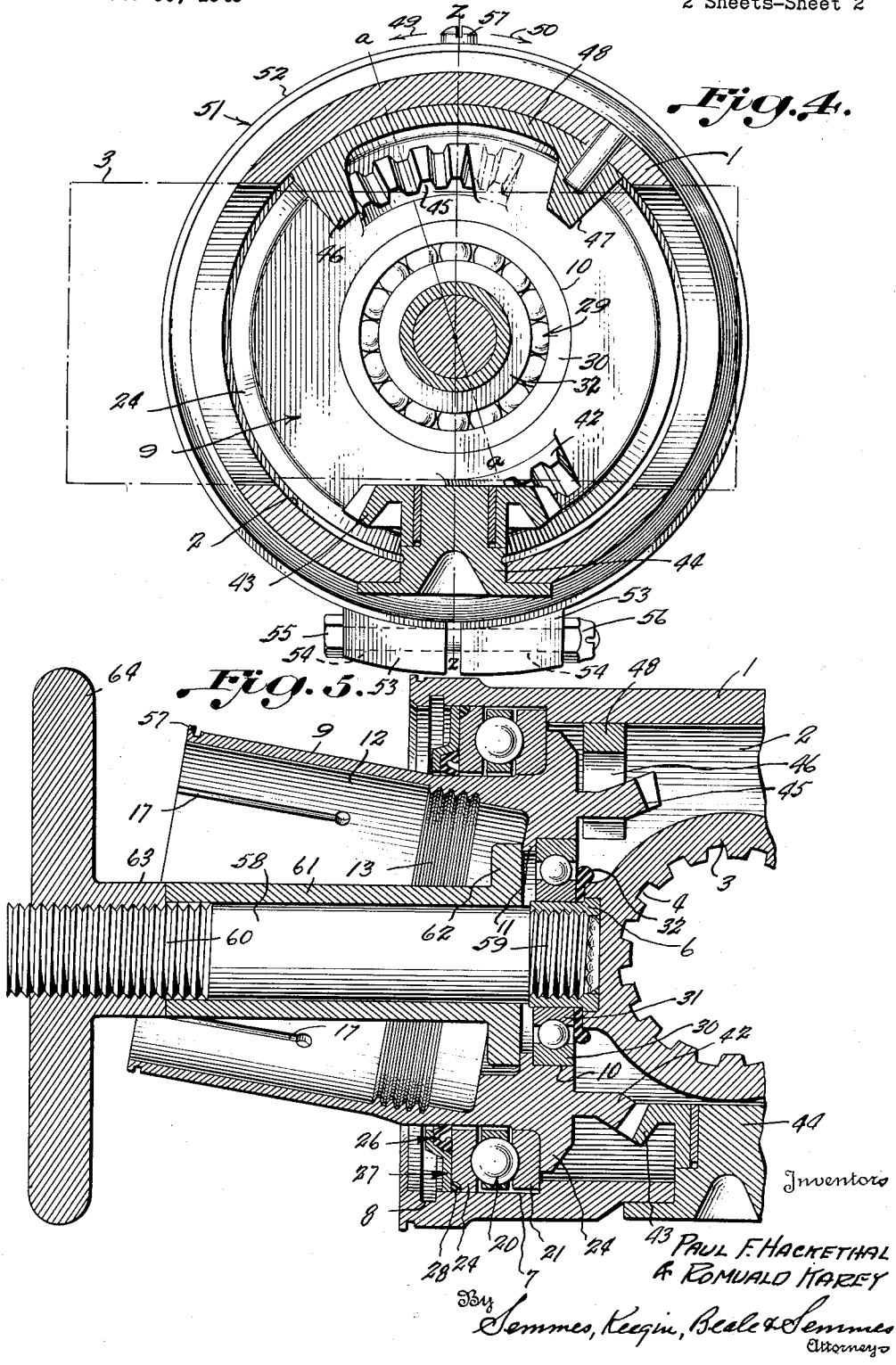

2,528,236

UNITED STATES PATENT OFFICE 2,528,236

AIRCRAFT PROPULSION UNIT

Paul F. Hackethal, Cockeysville, and Romuald Karey, Baltimore, Md., assignors to Everel Propeller Corporation, Baltimore, Md., a corporation of Maryland Application October 30, 1943, Serial No. 508,352

8 Claims. (Cl. 170—160.23)

The present invention relates to propellers for aircraft and more particularly to a hub construction for automatic variable pitch propellers.

An automatic pitch propeller has been developed in which the propeller blades automatically assume correct pitch angle in accordance with given conditions of flight by rotation of the blades within the hub. This is effected by securing the shank of the blade in a sleeve and mounting the sleeve for rotation in a socket provided therefor in the hub, the longitudinal axis of the blade being at an angle to the rotational axis of the sleeve.

The operation of the propeller is affected by various conditions principally by the relationship of the following forces—the aerodynamic force due to thrust reacting on the blades in the direction normal to the plane of rotation of the propeller tending to move the angularly disposed blade about the arc of the cone in forward direction, thus decreasing the pitch; the centrifugal force of the blade being either pitch decreasing or pitch increasing depending upon blade orientation whether in forward or rear quadrant with respect to plane of rotation, and the centrifugal force of a counterweight tending to bring all forces into state of equilibrium.

Means have been incorporated in the hub structure for synchronizing the movement of the several blades in multi-blade constructions and also for limiting the pitch change movement of the blades. Means have likewise been incorporated in hub constructions for this type of propeller to balance the propeller assembly about its rotational axis. In addition, antifriction bearings have been incorporated in the hub constructions to assure frictionless movement of the blades in the hub while being subjected to the high centrifugal and bending loads.

While a high degree of perfection has been reached in the hub construction for the above type of automatic variable pitch propeller, there are still certain inherent disadvantages in the constructions heretofore developed, and it is the purpose of this invention to overcome these disadvantages and to provide an improved hub structure.

For instance, while various means have been devised for balancing the propeller assemblies about their rotational axes, or, in other words, in a horizontal plane, or equal importance is that the propeller should also have vertical balance. In other words, the propeller assembly should be balanced about an axis which is perpendicular to the rotational axis of the propeller whereby the weight of the assembly is equally distributed on both sides of the plane of rotation. This is of particular importance in the above described type of propeller wherein the pitch of the blade is affected by forces acting along lines parallel and perpendicular to the rotational axis of the unit.

Then too, when utilizing ball bearings in the hub structure, they should operate at maximum efficiency. To obtain this result, the bearings should be loaded under all conditions of operation. Of course, when the propeller is operating at high speeds, centrifugal force acting on the blades sufficiently loads the bearings, but when operating at idling speeds, this load is obviously reduced and, as a consequence, the operating efficiency of the bearing is lowered. While various means have been suggested for pre-loading the bearings, all of these means have heretofore necessitated complicated hub structures which also tend to complicate the assembly of the several parts constituting the unit.

These propellers have often been used on aircraft provided with two engines. One of the principal purposes of multiplying the number of engine installations of aircraft is to provide sufficient motive power to carry the aircraft should one of the engines fail. Actually, however, with present propeller constructions, airplanes, when attempting to fly with one engine out of operation, windmilling of the propeller of the failed engine constitutes an increase in frontal area of the airplane. This frontal area is equal to the wall diameter of the windmilling propeller and often produces such a drag that the main engine will not carry the fully loaded airplane.

Propellers, which change their pitch as above set forth, assume the minimum pitch angle of the blade during takeoff period and the maximum pitch angle of the blade at normal full throttle level flight or in a dive condition, the pitch changing movement being limited by the stop mechanism incorporated in the hub. It is known that if the blades of a windmilling propeller be allowed to assume a pitch angle greater, even by a small amount, than this maximum, or, in other words, be allowed to feather more into the relative air stream, the drag produced by the frontal wall offered by the windmilling propeller will be reduced sufficiently to permit the remaining operating engine to carry the load of the airplane.

Great difficulty, however, has been encountered in devising a blade synchronizing and rotation limiting mechanism which will permit the blade sufficient rotational movement in the hub to feather without materially increasing the size and weight of the hub structure. We have discovered, however, a novel arrangement of synchronizing and stop mechanism whereby the pitch change movement of the blades may be increased sufficiently to permit the blades to rotate in the hub beyond the maximum operating pitch angle and thereby permit the blades to feather sufficiently to materially reduce the drag normally offered by the windmilling propeller. This is accomplished without disturbing either the size or the balance of the propeller unit.

It is therefore one of the objects of this invention to provide a hub structure for automatic variable pitch propellers which incorporates a pitch changing mechanism permitting the pitch angle of the blades to vary from the lowest angle necessary for normal operation to an angle in excess of the maximum required for normal operation.

Another object of the invention is to provide a propeller assembly which incorporates means for balancing the unit about its rotational axis in both planes—horizontal and vertical—in order to obtain a perfectly balanced unit, which means may be easily adjusted after complete assembly of the propeller.

Yet another object is to provide a novel means for pre-loading the bearings of an automatic variable pitch propeller which may be easily accomplished during the assembly of a unit.

Yet another object is to provide a tool for assembling pre-loaded units of the above type.

A further object of the invention is the provision of a novel oil sealing arrangement to effectively prevent leakage of lubricating oil from the propeller hub and yet which will not offer appreciable frictional resistance to the operating parts of the unit.

A still further object is to provide a propeller hub construction of the above character which is simple in its structure, operation and assembly, which is economical to manufacture and which is highly efficient in its operation.

With these and other objects in view, which may be incident to our improvements, the invention consists in the parts and combinations to be hereinafter set forth and claimed, with the understanding that the several necessary elements comprising our invention may be varied in construction, proportions and arrangements, without departing from the spirit and scope of the appended claims.

In order to make our invention more clearly understood, we have shown in the accompanying drawings means for carrying the same into practical effect without limiting the improvements in their useful applications to the particular constructions which, for the purpose of explanation, have been made the subject of illustration.

In the drawings:

Figure 1 is a longitudinal sectional view taken through a two-blade hub construction made in accordance with this invention, only the shanks of the propeller blades being illustrated.

Figure 2 is an enlarged fragmental sectional view illustrating one of the oil sealing elements employed in the hub construction.

Figure 3 is a view similar to Figure 2 showing a modified form of oil seal.

Figure 4 is a cross sectional view taken along the line 4—4 of Figure 1 looking in the direction of the arrows.

Figure 5 is a fragmental view similar to Figure 1 illustrating the method of assembling the hub by means of a novel tool.

Referring more particularly to the structure as illustrated in Figure 1, there is shown a hub construction for an automatic variable pitch propeller of the two-blade type. While such structure is shown for the purpose of illustration, obviously principles herein involved are equally adaptable to either single or other multi-blade propellers either of automatic variable pitch type, or adjustable pitch type, or controlled pitch type wherein the blades are mounted for rotation in the hub.

The hub, as illustrated in Figure 1, comprises a cylindrical barrel portion 1 longitudinally bored as at 2 to provide sockets for the reception of blade shanks. Transversely positioned in the barrel 1 is a shaft coupling sleeve 3 internally splined as at 4 to provide means for coupling therein the splined end of a propeller shaft (not shown). On opposite sides of sleeve 3 there is provided a socketed boss 5 in each of which is secured, such as by welding, a hollow internally threaded pivot member 6 in coaxial alignment with the longitudinal axis of the barrel 1.

At each end of the barrel 1 the bore 2 is somewhat enlarged as indicated at 7 and an internal annular groove 8 is provided in the enlarged portion 7 of the bore 2 adjacent the ends of the barrel.

Positioned in the barrel 1 on opposite sides of the shaft coupling sleeve 3 is a blade mounting sleeve or blade flange 9 which is bored axially adjacent its inner end, as indicated at 10, and provided with an internal flange 11. The sleeve 9 is also provided with a bore 12 extending from the outer end of the sleeve to adjacent the internal flange 11. This bore 12 is at an angle to the longitudinal axis $x$—$x$ of the sleeve as indicated by the dotted axis line $y$—$y$.

The bore 12 is provided adjacent its inner end with internal screw threads 13 by means of which an externally threaded shank 14 of a propeller blade 15 may be secured in the bore 12. To prevent rotation of the blade in the sleeve member 9, clamping means, indicated generally as 16, and consisting essentially of a constrictable collar is positioned about the periphery of the sleeve 9, the sleeve 9 being provided with longitudinal slits 17 to permit its constriction into frictional engagement with the blade shank. The collar 16 may be extended radially so as to provide a counterweight.

Preferably, a compressible packing member or gasket 18 is inserted in the bore 12 between the bottom thereof and the end of the blade shank. This gasket being compressible will permit a certain amount of axial movement of the threaded shank in the bore 12 to permit initially adjusting the pitch of the blade while prohibiting escape of lubricating oil from the interior of the propeller blade through the bore 12. In certain types of propeller blades, where it is undesirable to prevent oil to contact the root of the blade, a sealing member such as the metallic plate 19 may be sealed over the root face of the blade.

Each sleeve 9 carries an annular thrust element designated generally as 20 which consists of parallel ball races 21 and 22 between which are positioned bearing balls 23. The ball race 21 engages the outer surface of the sleeve 9 and seats against an external flange 24 provided on the sleeve at its inner end. The race 22, on the other hand, is free to rotate with respect to the sleeve, engaging the surface of the enlarged portion 7 of the bore 2. Outward movement of the thrust bearing 20 is blocked by means of a snap ring element 25 which is positioned in the groove 8.

An oil sealing element consisting of an annular flexible gasket member 26 (to be further described) is held within a retaining ring 27 positioned between the outer face of the ball race 22 and the snap ring element 25. An additional oil sealing gasket 28 is provided between the outer race 22 and the ring member 27 and the inner surface of the barrel. The sealing members 26 and 28 effectively prohibit leakage of oil from the interior of the hub past the relatively movable parts as will be set forth in more detail later.

In addition to the thrust bearing 20 a second journal is provided for additionally supporting the sleeve 9 within the barrel 1. This latter journal consists of a radial ball bearing element 29 comprising an outer race 30 carried within the bore 10 and seated against the internal flange 11, and an inner race 31 carried on the pivot 6.

As above set forth, it is important that the thrust bearing 20 be maintained under load. To accomplish this, a compressible member 32 is positioned about the pivot 6 and interposed between the end of the boss 5 and the inner face of the bearing race 31. While the element 32 may consist of a metallic spring, to keep the structure as compact as possible, the element is preferably made in the form of a flexible washer composed of oil resistant synthetic rubber or other suitable compressible material, its width and compression factor being selected to maintain a positive load on the thrust bearing 20 when the unit is assembled for use. The compression factor of the element 32 is likewise selected with reference to the compression factor of the sealing gaskets 26 and 28 to maintain these gaskets in proper sealing condition.

The oil sealing element 26 is shown in more detail in Figure 2 and consists of an annular member composed of neoprene or other suitable resilient oil resistant material with an inwardly inclined outer peripheral wall 33, having a bead portion 34 adjacent its edge, and an inwardly inclined annular flap portion 35 joined to the wall 33 by a radial web 36. As also seen in Figure 2, the retaining ring 27 comprises an inwardly tapered annular wall portion 37 which corresponds to the slope of wall 33 of the sealing ring 26. The wall 37 has an external flange 38 adapted to fit between the bearing race 22 and the snap ring 25, and an internal flange 39 which engages the web portion 36 of the seal. The bead 34 has a substantial cross sectional area so that when pressure is exerted by means of the loading element 32, the wall 33 will not tend to buckle and break the seal between the surface thereof and the inner surface of the annular wall 37 of the retaining ring 27. Instead of buckling, the bead 33 compresses somewhat exerting a pressure substantially normal to the surface of the wall portion 37 to increase the interengagement of the seal with the retaining ring.

The flap portion 35 of the seal engages the rotatable sleeve 9 and is sufficiently thin and resilient to maintain a sealing contact with the sleeve 9 at all times. It will be noted, however, that the angular disposition of the flap portion 35 is counter to the direction of oil pressure tending to escape from the barrel 1 and will increase its contact with the sleeve 9 when increase in centrifugal force increases oil pressure against the seal.

The modified form of seal illustrated in Figure 3, and which finds advantageous use under certain conditions, is essentially the same as that illustrated in Figure 2 with the exception that the outer peripheral wall 33a, instead of being inclined, is parallel to the axis of the barrel 1, engaging a cylindrical wall 37a of the retaining ring 27a. The outer wall 33a is made somewhat short to prevent its buckling when pressure is applied on the sealing member by the compression element 32. The flap portion 35a must, however, be substantially long to insure flexibility and contact with the rotating surface of the sleeve 9, and, to compensate for the difference in the lengths of the flap portion 35a and the wall 33a, gaskets 40 and 41 are interposed between the inner edge of the wall 33a and the outer face of the bearing race 22. One of these gaskets, the gasket 41, adjacent the race 22, is preferably made of metal, while the one abutting the sealing member 26a is composed of a somewhat compressible material such as cork. This cork serves, in effect, as a cushion to absorb a portion of the compression load imposed on the sealing gasket.

With the longitudinal axis $y$—$y$ of the blade arranged at an angle to the rotational axis $x$—$x$ of the sleeve, and with the propeller rotating in a counter-clockwise direction, as indicated by the curved arrow in Figure 1, forces reacting on the blades will cause them to be moved through the arc of a cone defined by the intersecting axes $x$—$x$ and $y$—$y$, the blades rotating relative to the barrel 1 to thereby change the pitch angle of the blades. As stated, the principal pitch changing forces are the reactions of air thrust and centrifugal force on the blades and the counterweights. The reaction of air thrust on the blades tends to pull them forward of the plane of rotation of the propeller to decrease the pitch, while reaction of centrifugal force tends to return the longitudinal axis of the blade into the plane of rotation to increase the pitch of the blades. When these forces, acting in directions parallel to and normal to the plane of rotation, are in equilibrium, the correct pitch angle of the blade for existing conditions, i. e., speed of the engine and density of the air, will be assumed.

In order to synchronize the pitch changing movement of the blades 15, each of the blade sleeves 9 is provided on its inner end with an axially projecting concentric arcuate gear section 42 which are operatively connected by means of a pinion member 43 pivotally mounted on a stud 44 projecting radially into the barrel 1 intermediate the ends thereof. Diametrically opposite the gear section 42, the inner end of each sleeve carries a similar arcuate element 45, which constitutes an abutment or lug adapted to engage inwardly projecting ends 46 and 47 of a segmental stop member 48 to thereby limit the rotational movement of the sleeve. While the lug members 45 are shown as being provided with gear teeth, and these members may be interconnected in a manner similar to the gear sections 42, in the hub illustrated, the principal purpose of so forming the lugs 45 is for ease of manufacture and to equally balance the sleeve.

The stop member 48 is suitably secured to the inner face of the bore 2 symmetrically on each side of a center line $z$—$z$ which lies in the plane of rotation of the hub. It will be noted that the angle between the members 46 and 47 of the stop member is made as wide as is permitted by the position of the shaft coupling sleeve 3. The member 48 is designed so that its weight substantially equals the weight of the pinion member 43 and its pivot 44 and, since the stop lug member 45 is equal in weight to the gear segments 42, a substantially equal distribution of weight about the axis $x$—$x$ of the hub is obtained.

In the usual arrangement of the parts constituting the synchronizing mechanism and pitch change limiting mechanism, the gear sections and the stop lugs are arranged symmetrically on both sides of the plane of rotation $z$—$z$ of the hub so that when the stop lug moves into the forward quadrant, which is represented by the arrow 49, and contacts its cooperating blocking element, the pitch angle of the blade is minimum; and when the stop lug moves into the after quadrant, indicated by the arrow 50, and contacts the opposed blocking member, the pitch angle of the blade is maximum with the inclined axis $y$—$y$ of the blade coinciding with the central line $z$—$z$ or the plane of rotation of the hub.

In the present construction, however, the gear sections 42 and the stop lugs 45 are symmetrical on both sides of a center line $a$—$a$ which is displaced angularly with respect to the plane of rotation of the hub in the direction of low pitch movement of the blade flanges so that when the blade has assumed its minimum pitch angle, the stop lug 45 is in contact with the projection 46. This is shown in Figure 4. Also illustrated in this figure (by dotted lines) is the position of normal maximum pitch wherein the center line $a$—$a$ has rotated in a clockwise direction to coincide with the plane of rotation $z$—$z$ of the propeller. When the lug 45 is in this position, there will still be a considerable clearance between the stop lug 45 and the projection 47 to permit further movement of the lug into the rear pitch change quadrant 50.

From the above, it will be clearly understood that since the maximum normal operating pitch of the blade is when the center line $a$—$a$ coincides with the line $z$—$z$, further rotational movement of the flange will still further increase the pitch angle of the blades and thereby permit them to feather more into the relative air stream. This condition only occurs in the event that the engine ceases to operate and air thrust acting on the frontal area of the windmilling blades overcomes the effect of the centrifugal force tending to maintain the blades in the plane of rotation of the propeller. It has been found that displacement of the center line $a$—$a$ from the plane of rotation $z$—$z$ of approximately 10° in the direction of low pitch movement of the sleeve will accomplish the desired results, allowing the blades to feather sufficiently to stop windmilling at relatively high forward air speeds.

The construction of a propeller assembly as above described is such that it is in substantial horizontal balance, that is, the parts on one side of the center line $b$—$b$ are substantially the same as those on the other side. Likewise, the mass of material comprising the assembly is substantially the same on each side of the axis $x$—$x$ of the barrel. It is extremely difficult in manufacturing the parts, however, to bring the completed assembly in absolute balance. In order to accomplish such balance in the completed assembly, there is provided adjacent each end of the barrel 1 a split collar 51 consisting of a band 52 completely surrounding the barrel. Each of the collars 51 has secured thereto, adjacent the ends of the band 52, a pair of weighted blocks 53 which are laterally bored to provide aligned apertures 54 through which is adapted to pass a bolt 55 provided on its opposite end with a nut 56 for drawing the split collar member 51 into frictional engagement with the barrel 1. To block outward movement of the collars 51 during operation of the propeller, each end of the barrel 1 is provided with a slight external flange 57.

When the propeller is assembled with the blades in place and the eccentrically weighted collar members 51 also in place, but loosely engaging the barrel, the propeller assembly is placed on the balancing fixture in the usual way, supported for rotation about the axis of the shaft coupling sleeve 3. If the assembly is found to be out of balance, that is, if the mass of material on one side of the line $b$—$b$ is found to be greater than that on the opposite side, the assembly may be brought into balance by drilling, filing or otherwise removing material from the blocks 53 on the heavier side of the propeller until the assembly is brought into perfect horizontal balance.

After horizontal balance has thus been obtained, the assembly is then turned around 90° with the horizontal axis $x$—$x$ being placed in a vertical plane. If the mass of assembly is not equally distributed about the vertically positioned axis $x$—$x$ of the barrel, the propeller will obviously be out of vertical balance. This, however, is easily corrected by rotating either one or both the collar members 51 about the barrel 1 to move the weights 53 relative to the plane of rotation of the propeller and thereby bring the propeller also into perfect vertical balance. When this has been accomplished, the nuts 56 are drawn up on their bolts to constrict the collar members 51 into close frictional engagement with the barrel and thereby prevent further displacement of weights. As an additional means of preventing this displacement, if desired, the collar members 51, after the balance has been effected, may be suitably secured to the hub such as by means of screws 57A.

Such a construction, it will be seen, provides a simple, easily accessible and accurately adjustable means for bringing propellers into absolute balance about both horizontal and vertical axes. If in use the propeller assembly should again become unbalanced, through slight damage or otherwise, it may be brought back into balance by the above procedural steps without disassembly of the unit.

The method of assembling the hub structure above described is best shown in Figure 5 and comprises the following:

The thrust bearing unit 20 is first placed on the sleeve 9 abutting the flange 24 and the sealing gaskets 23 and 26 with the retaining ring 27 are also placed in the position shown. The radial bearing unit 29 is next inserted in the bore 19 to abut the inner face of the flange 11. The compressible loading member 32 is next placed on the hollow pivot 6 and the assembled sleeve unit is inserted in the end of the barrel so that the inner race 31 of the radial bearing is positioned on the pivot 6 abutting the face of the compression member 32. It must be understood that the compression ring 32 is of such width that when the parts are in finally assembled position, as shown in Figure 1, the member 32 will be somewhat compressed. However, in its normal condition, when the parts are initially assembled, at least a portion of the outer race 22 of the bearing 20 and ring 27 will overlap the grooves 8.

To compress the element 32 to permit insertion of the snap ring 25 within its groove 8, the tool illustrated in Figure 5 is employed. This tool consists essentially of a rod 58 provided with a reduced screw threaded extension 59 at one end for engaging the hollow threaded pivot member 6. The rod 58 is likewise threaded on its opposite end as indicated at 60. Loosely fitted about the rod 58 is a collar 61 provided on one end with a flange 62 for engaging the flange 11 of the sleeve 9. The opposite end of the collar 61 is adapted to engage the hub portion 63 of a handle 64 which is internally bored and threaded to enable it to be screwed up onto the threaded portion 60 of the rod.

After the sleeve 9 has been inserted in the end of the barrel 1, the rod 58 is then screwed into the hollow pivot 6 until the shoulder formed by the reduced extension engages the face of the pivot. The collar 61 is next placed on the rod in its operating position and the handle 64 is screwed up on the rod 48 forcing the collar toward the center of the barrel 1. As a consequence, the sleeve 9 is forced further within the barrel, compressing the member 32 until the bearing 20 and seal retaining ring 27 have cleared the groove 8, as shown in Figure 2. When the groove is thus cleared, the snap ring 25 is inserted in the groove 8 and the handle 64 turned in the opposite direction allowing the compression element 32 to expand and force the sleeve and its thrust bearing 20 outward against the snap ring 25. The compressing tool may then be removed from the hub and the blade 15 inserted in the sleeve 9. The same procedure is then followed for the other blades constituting the propeller.

In the above description, it will be seen that we have provided an automatic variable pitch propeller mechanism which is capable of perfect horizontal and vertical balance and which permits a wide angle of pitch change rotation of the blades and also in which the bearings and oil sealing elements are maintained under proper loaded conditions. Moreover, the construction, according to this invention is easily assembled, is simple and economical to manufacture and maintain at an optimum operating condition.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. In a variable pitch propeller construction, a hub having a blade mounting barrel, a blade shank receiving flange mounted for rotation in said barrel, a thrust bearing carried by the flange, blocking means adjacent the outer end of the barrel for limiting outward movement of said bearing, resilient loading means within the barrel and engaging said flange for exerting an outward thrust thereon against the blocking means to load said thrust bearing means, an annular support interposed between the blocking means and said bearing, and a resilient sealing element carried by the support and operatively engaging said flange and a second sealing element interposed between the support, bearing and barrel to prevent oil leakage between the barrel and flange.

2. In a variable pitch propeller construction, a hub having a blade mounting socket, a blade shank receiving flange mounted for rotation in said socket, a thrust bearing carried by the flange, blocking means adjacent the outer end of the socket for limiting outward movement of said bearing, resilient loading means within the socket and exerting an outward thrust on the flange for loading said thrust bearing means, an annular support having a peripheral flange interposed between the blocking means and thrust bearing, a resilient sealing element carried by the support and operatively engaging the flange, and a second annular resilient sealing element interposed between the thrust bearing and support.

3. In a propeller construction, a hub having a shaft coupling element and cylindrical blade mounting barrels disposed radially with respect thereto, a blade shank receiving sleeve rotatably positioned in each of the barrels, a propeller blade secured in each of said sleeves with its axis at an angle to the rotational axis of the sleeve whereby a rotation of the blade about its longitudinal axis is effected by a movement of said longitudinal axis in an arc of a cone upon rotation of the sleeve, an arcuate lug member concentrically carried by the inner end of each of said sleeves, a pair of stop elements supported within each socket in the path movement of the lug member, one of each pair of stop elements being in the quadrant forward of said plane of rotation and the other of each pair of stop elements being in the quadrant to the rear of said plane, and gear means within the barrel interconnecting said sleeves for synchronizing the rotation thereof.

4. In a propeller construction, a hub having a shaft coupling element and cylindrical blade mounting barrels disposed radially with respect thereto, a blade shank receiving sleeve rotatably positioned in each of the barrels, a propeller blade secured in each of said sleeves with its axis at an angle to the rotational axis of the sleeve whereby a rotation of the blade about its longitudinal axis is effected by a movement of said longitudinal axis in an arc of a cone, a concentric arcuate lug member projecting from the inner end of each sleeve adjacent the periphery thereof, an arcuate toothed member projecting from the inner end of each of the sleeves diametrically opposite said lug member, a pivoted toothed member supported within the hub and operatively connecting said arcuate toothed members, and a pair of stop elements supported within each barrel in the path of movement of the lug members, one of each pair of stop elements being in the quadrant forward of said plane of rotation and the other of each pair of stop elements being in the quadrant to the rear of said plane.

5. In a propeller construction, a hub having a cylindrical blade mounting barrel and a tubular shaft coupling element passing transversely therethrough intermediate its ends, a rotatable blade shank receiving sleeve in opposite ends of the barrel and having their inner ends journalled to the shaft coupling element, a propeller blade secured in each sleeve with the axis of the blade at an angle to the rotational axis of the sleeve whereby a rotation of the blade about its longitudinal axis is effected by a movement of said longitudinal axis in an arc of a cone, a concentric arcuate toothed member projecting from the inner end of each sleeve and overlying the shaft coupling member, a pivoted toothed member operatively connecting the arcuate toothed members, a diametrically opposed similar concentric arcuate lug member projecting from the inner end of each sleeve and overlying said shaft coupling element, and a pair of stop elements supported within the hub in the path of movement of the lug members, one of each pair of stop elements being in the quadrant forward of the said plane of rotation and the other of each pair of stop elements being an equal distance in the quadrant to the rear of said plane.

6. A propeller construction according to claim 5 in which the arcuate lug member and arcuate toothed member are symmetrical about a center line displaced at an angle to the said plane of rotation in the direction of low pitch rotation of the sleeve.

7. A propeller assembly for aircraft comprising in combination a blade mounting element having blade mounting sockets therein, a transverse tubular shaft coupling member secured to said element perpendicular to the axes of the sockets, a pivot member carried by said member concentric with each of the sockets, a sleeve rotatably mounted in each socket, each of said sleeves being provided with radial bearing means adjacent its inner end for journalling said sleeves to said pivots, an external flange on each sleeve, an annular blocking member within each socket for limiting outward displacement of the sleeve, thrust bearing means interposed between said flange and blocking member, an annular resilient plastic loading member supported by each pivot and exerting an outward thrust on the sleeve to load said bearing means, a propeller blade secured in each sleeve with the longitudinal axis of the blade at an angle to the rotational axis of the sleeve whereby a rotation of the blade about its longitudinal axis is effected by a movement of said longitudinal axis in an arc of a cone, gear means interconnecting said sleeves for synchronizing rotational movement thereof, a pair of stop members within each socket, one of each pair of stop members being in a quadrant forward of said plane of rotation and the other of each pair of stop members being in the quadrant to the rear of said plane, a lug on the inner end of each sleeve and adapted to engage said stop members for limiting the maximum and minimum pitch position of the blade, resilient sealing elements associated with said sleeves and sockets for preventing leakage of lubricating oil from the sockets, and weighted means supported by the blade mounting element adjacent each of said sockets and adjustable about the longitudinal axis thereof for balancing the propeller assembly.

8. In a variable pitch propeller construction, a unitary hub having a tubular shaft coupling element and a cylindrical blade mounting barrel radially disposed wtih respect thereto, a blade receiving sleeve having an inner end mounted for rotation in the barrel, the inner end of said sleeve having an external flange and an internally shouldered axial socket, said barrel having an internal peripheral groove therein, a snap ring inserted in said groove, anti-friction thrust bearing means surrounding said sleeve between said flange and snap ring, a cylindrical externally shouldered pivot member carried by the shaft coupling element and extending radially therefrom in coaxial alignment with said barrel, radial anti-friction bearing means having an inner race mounted on said pivot for axial movement thereon and an outer race seated in said shouldered socket, annular resilient compressible loading means positioned between said inner race and the shoulder of said pivot member and exerting an outward thrust on said sleeve to load said thrust bearing against said snap ring, said socket having an opening into the blade mounting sleeve and registering with said pivot member to permit an inter-connection between said sleeve and pivot member for moving the sleeve relatively to the pivot member thereby to compress said resilient loading means to permit insertion of the snap ring in said groove.

PAUL F. HACKETHAL.
ROMUALD KAREY.

REFERENCES CITED

The following references are of record in the file of this patent:

UNITED STATES PATENTS

| Number | Name | Date |
|---|---|---|
| 1,608,755 | McCauley | Nov. 30, 1926 |
| 1,693,450 | McCauley | Nov. 27, 1928 |
| 1,820,814 | Lougheed | Aug. 25, 1931 |
| 1,907,504 | Chilton | May 9, 1933 |
| 1,995,312 | Larason | Mar. 26, 1935 |
| 2,033,342 | Lansing | Mar. 10, 1936 |
| 2,107,785 | Grabarse | Feb. 8, 1938 |
| 2,118,574 | Squires | May 24, 1938 |
| 2,152,805 | Hoffman | Apr. 4, 1939 |
| 2,219,303 | Fraser | Oct. 29, 1940 |
| 2,233,364 | Gemey | Feb. 25, 1941 |
| 2,237,030 | Gathmann | Apr. 1, 1941 |
| 2,290,196 | Martin | July 21, 1942 |
| 2,294,867 | Bottrill | Sept. 1, 1942 |
| 2,300,233 | Martin | Oct. 27, 1942 |
| 2,303,707 | Pullin | Dec. 1, 1942 |
| 2,336,012 | Hackethal | Dec. 7, 1943 |

FOREIGN PATENTS

| Number | Country | Date |
|---|---|---|
| 397,450 | Great Britain | Nov. 16, 1931 |
| 485,102 | Great Britain | May 13, 1938 |